United States Patent [19]

Bodolus et al.

[11] Patent Number: 4,692,498

[45] Date of Patent: Sep. 8, 1987

[54] NOVEL RUBBER-MODIFIED THERMOPLASTIC RESIN COMPOSITIONS

[75] Inventors: Christopher L. Bodolus, Cleveland, Ohio; David A. Woodhead, S. Glamorgan, Wales

[73] Assignee: The Standard Oil Company, Cleveland, Ohio

[21] Appl. No.: 762,311

[22] Filed: Aug. 5, 1985

Related U.S. Application Data

[63] Continuation-in-part of Ser. No. 535,726, Sep. 26, 1983, Pat. No. 4,542,189.

[51] Int. Cl.$^4$ .................. C08F 279/02; C08F 255/06; C08F 283/06
[52] U.S. Cl. .................................. 525/285; 525/207; 525/404; 525/53; 525/315
[58] Field of Search ............... 525/285, 207, 404, 315, 525/53

[56] References Cited

U.S. PATENT DOCUMENTS

| | | | |
|---|---|---|---|
| 2,914,505 | 11/1959 | Roper et al. | 260/45.5 |
| 3,511,895 | 5/1970 | Kydonieus et al. | 260/876 |
| 3,919,354 | 11/1975 | Moore et al. | 260/880 R |
| 3,928,495 | 12/1975 | Dalton | 260/876 R |
| 3,931,356 | 1/1976 | Dalton | 260/876 R |
| 4,223,096 | 9/1980 | Lee et al. | 525/74 |
| 4,262,096 | 4/1981 | Lee et al. | 525/285 |
| 4,308,354 | 12/1981 | Jung et al. | 525/84 |
| 4,542,189 | 9/1985 | Bodolus et al. | 525/285 |

FOREIGN PATENT DOCUMENTS

| | | | |
|---|---|---|---|
| 3140565 | 4/1983 | Fed. Rep. of Germany | 525/207 |
| 0074313 | 5/1982 | Japan | 525/285 |

*Primary Examiner*—Briggs, Sr., Wilbert J.
*Attorney, Agent, or Firm*—David P. Yusko; John E. Miller; Larry W. Evans

[57] ABSTRACT

Rubber-modified thermoplastic resins are characterized by having a high content of olefinically unsaturated nitriles and good transparency. These thermoplastic resins generally comprise from about 43 to about 75 parts by weight of a monovinyl aromatic monomer, from about 20 to about 40 parts by weight of an olefinically unsaturated nitrile monomer and from about five to about 35 parts by weight of an unsaturated dicarboxylic acid anhydride monomer, providing 100 parts of a thermoplastic terpolymer, and from about two to about 30 parts by weight of rubber polymer per 100 parts of the thermoplastic terpolymer. Other resins characterized by having between about 30 to 45 parts by weight of unsaturated dicarboxylic acid anhydride exhibit good heat distortion temperatures.

18 Claims, 2 Drawing Figures

FIG. 1

NOVEL RUBBER-MODIFIED THERMOPLASTIC RESIN COMPOSITIONS

CROSS-REFERENCE TO RELATED APPLICATION

This application is a continuation-in-part of U.S. Ser. No. 535,726 filed Sept. 26, 1983, U.S. Pat. No. 4,542,189.

TECHNICAL FIELD

Styrene is an inexpensive, reactive monomer for the production of general use polymer resins. Widespread application of such resins is, however, limited by the brittleness and only moderate physical properties of polystyrene. Such polymers are routinely toughened with rubber in known suspensions and bulk polymerization processes to produce high impact polystyrene or HIPS. Adding a third component, such as acrylonitrile to form, often by an emulsion process, acrylonitrile-butadiene-styrene or ABS resins is also known and provides further improved properties such as tensile and impact strength.

The present invention provides yet another type of rubber-modified thermoplastic resin composition having a variety of improved and useful properties such as impact strength, tensile properties, heat stability and solvent resistance. One such resin of proven utility is the terpolymer of styrene, maleic anhydride and acrylonitrile and the process provided herein can produce higher concurrent levels of maleic anhydride and acrylonitrile as compared with the products from known bulk solvent or solvent assisted processes. These resins are useful in injection and compression molding applications where high temperature stability thermoplastics are desired. The process of the present invention is conducted in a single vessel, preferably a twin screw reactor extruder.

In our copending parent application a process was set forth for the preparation of rubber modified thermoplastic resins comprising terpolymers of monomers such as, for example, styrene, acrylonitrile and maleic anhydride. Certain resins produced by this process can have unusually high amounts of acrylonitrile, on the order of at least about 20 percent by weight based upon 100 parts of resin without rubber. Other resins, also produced by this process, can have high amounts of maleic anhydride, on the order of 30 to 45 percent by weight based upon 100 parts of resin without rubber. The present application is directed specifically toward such resin compositions which contain from about two to about 30 parts of rubber per 100 parts of resin (phr).

BACKGROUND ART

Terpolymers comprising styrene, maleic anhydride and acrylonitrile which have been modified by an elastomer have been described in several U.S. patents. One early one, U.S. Pat. No. 2,914,505, provides a blend comprising 10 to 40 parts of an elastomer of a conjugated diolefin and acrylonitrile with 60 to 90 parts of a terpolymer of the above-recited type. Such compositions are prepared either by blending of the two polymers mechanically, as on a two roll mill or Banbury mixer, or by mixing latices of each, followed by coagulation and drying of the mixture. The compositions are said to exhibit enhanced softening points and although a temperature range is not disclosed, the patentees indicate that then existing compositions had low softening points, in the region of 100° C. Although the terpolymer can contain high amounts of maleic anhydride and acrylonitrile, e.g., 50 to 80% styrene, 5 to 35% maleic anhydride and 15 to 40% acrylonitrile, blending of the rubber in the manner described does not afford a uniform graft structure leading, in turn, to the most improved physical properties.

U.S. Pat. No. 3,919,354 discloses impact resistant polymers comprising rubber modified copolymers of alkenyl aromatic and unsaturated dicarboxylic anhydride monomers. Proportions reacted include 65 to 95 parts by weight of alkenyl aromatic and 35 to 5 parts by weight of the unsaturated anhydride. The amount of rubber ranges from about 5 to 35 parts per 100 parts of the total weight of monomers and rubber. The patent further discloses that comonomers polymerizable with the alkenyl aromatic monomer such as acrylonitrile can be present in a proportion of 10 to 40 weight percent of the anhydride/butadiene/styrene polymer composition.

U.S. Pat. Nos. 4,223,096 and 4,262,096, assigned to Monsanto Company, provide respectively a process for preparing rubber-modified terpolymers and a terpolymer or resin which comprises 50 to 83% monoalkenyl aromatic monomer, 15 to 30% unsaturated dicarboxylic acid anhydride and 2 to 20% unsaturated nitrile. The terpolymer is also modified with 2 to 30% rubber such as butadiene polymers and copolymers.

The process calls for the polymerization of the monomers in the presence of the rubber with a gradual continuous addition of the anhydride monomer. More specifically, a solvent polymerization is employed wherein the rubber is dissolved in a mixture of the monovinyl aromatic monomer and the unsaturated nitrile monomer and a solvent such as methyl ethyl ketone and toluene. The resulting solution is polymerized with late addition of the anhydride dissolved in the same or similar solvent, as set forth in U.S. Pat. No. 3,919,354. While the patentees reported improved physical properties over resins unmodified with rubber, they also noted that only if the content of unsaturated nitrile in the polymer were maintained below about 20 percent, a moldable composition would be obtained that could be left at 120° C. for several days without becoming infusible. They found surprising that only a narrow range of compositions within the art were useful, viz., those having an unsaturated nitrile content of less than 20 percent.

The patents discussed herein have not disclosed a useful rubber-modified, thermoplastic resin containing 100 total parts by weight of an olefinically unsaturated nitrile monomer, a monovinyl aromatic monomer and an unsaturated dicarboxylic acid anhydride monomer where the nitrile monomer content is at least about 20 parts and can be higher or the anhydride monomer content is at least about 30 parts. Such resins are prepared in a simple one stage polymerization without solvents or continuous controlled addition of monomers.

DISCLOSURE OF THE INVENTION

It is therefore an object of the present invention to provide a process for the preparation of rubber-modified styrene/maleic anhydride/acrylonitrile thermoplastic resin compositions, which resins have desirable physical properties including elevated heat distortion temperatures and good impact strength and tensile properties.

It is yet another object of the present invention to provide a process for the preparation of rubber-modified styrene/maleic anhydride/acrylonitrile thermoplastic resin compositions containing at least about 20 weight percent acrylonitrile while still maintaining thermoplastic properties.

It is a further object of the present invention to provide a process for the preparation of rubber-modified high softening temperature thermoplastic resin compositions in a process which does not require a separate solvent for the unsaturated dicarboxylic acid anhydride and/or unsaturated nitrile monomers that are reacted.

It is yet another object of the present invention to provide a process for the preparation of rubber-modified thermoplastic resin compositions in a reactor extruder, which resins have improved properties over resins of similar compositions produced by mechanical blending of thermoplastic terpolymers and elastomers.

It is yet another object of the present invention to provide a process for the preparation of a broader range of processable rubber-modified thermoplastic resin compositions than has been possible with existing processes.

It is still another object of the present invention to provide a novel thermoplastic resin composition having an unsaturated nitrile content of at least about 20 weight percent and which remains thermoplastically processable even after repeated processing at temperatures up to 250° C. for 5 to 10 minutes.

It is yet another object of the present invention to provide a novel thermoplastic resin composition having an unsaturated dicarboxylic acid anhydride content of from about 30 to 45 weight percent per 100 parts of resin.

These and other objects, together with the advantages thereof over the prior art, which shall become apparent from the specification which follows, are accomplished by the invention as hereinafter described and claimed.

In general, the rubber-modified thermoplastic resins formed according to the process of the present invention are deemed to be novel apart from processing considerations and are characterized by having a high content of olefinically unsaturated nitrile. These resins possess good physical properties such as good heat distortion temperatures, transparency, good impact strength and, they are processable. The rubber-modified thermoplastic resins of this invention comprise from about 43 to about 75 parts by weight derived from a monovinyl aromatic monomer, from about 20 to about 40 parts by weight derived from an olefinically unsaturated nitrile monomer and from about five to about 35 parts by weight derived from an unsaturated dicarboxylic acid anhydride monomer providing 100 parts of a thermoplastic terpolymer and from about two to about 30 parts by weight of rubber polymer per 100 parts of the thermoplastic terpolymer.

A separate class of resins is also possible, having a high content of unsaturated dicarboxylic acid anhydride monomer and high heat distortion temperatures which comprises from about 43 to about 65 parts by weight of monovinyl aromatic monomer, from about five to about 27 parts by weight of olefinically unsaturated nitrile monomer and from about 30 to about 45 parts by weight of unsaturated dicarboxylic acid anhydride monomer, providing 100 parts of a thermoplastic terpolymer and from about two to 30 parts of the rubber polymer per 100 parts of the thermoplastic terpolymer.

PREFERRED MODE FOR CARRYING OUT THE INVENTION

Polymers prepared according to the process of the present invention can be polymerized within a twin screw reactor extruder as will be discussed hereinbelow. The polymer product or resin is prepared by polymerizing a feed solution, which comprises a solution of a preformed rubber polymer in a monomer selected from the group consisting of monovinyl aromatic monomers and olefinically unsaturated nitrile monomers along with a separate liquid monomer feed stream comprising an unsaturated dicarboxylic acid anhydride, an olefinically unsaturated nitrile monomer, and optionally, additional preformed rubber polymer.

The rubber-modified thermoplastic resin compositions that can be prepared according to the process of the invention include those which are produced by polymerizing a monounsaturated or olefinically unsaturated nitrile monomer, e.g., acrylonitrile, a monovinyl aromatic monomer component copolymerizable therewith such as styrene and an unsaturated dicarboxylic acid anhydride such as maleic anhydride.

More specifically, the olefinically unsaturated nitrile monomers that can be employed in the present invention are the alpha, beta-olefinically unsaturated mononitriles having the structure:

wherein R is hydrogen, a lower alkyl group having from one to four carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitriles useful in the present invention are acrylonitrile and methacrylonitrile and mixtures thereof.

The monovinyl aromatic monomers are those having from about eight to 20 carbon atoms including styrene, alpha-methyl styrene, halogen substituted styrene, such as chlorostyrene and bromostyrene, the vinyl toluenes, the vinyl xylenes and the like with styrene being preferred.

The unsaturated dicarboxylic acid anhydrides that can be employed are those having a carbon double bond and an internal anhydride group. The dicarboxylic acid anhydrides include maleic anhydride and simple substituted varients such as itaconic, citraconic and aconitic anhydrides.

As stated hereinabove, the feed solution being polymerized contains a preformed rubber polymer, preferably having a low glass transition temperature. Such polymers can be a homopolymer or copolymer of a conjugated diene monomer having from about four to twelve carbon atoms selected from the group consisting of butadiene-1,3, isoprene, chloroprene, bromoprene, cyanoprene, 2,3-dimethyl butadiene-1,3, 2-ethyl butadiene-1,3, 2,3-diethyl butadiene-1,3 and the like with butadiene-1,3 and isoprene being preferred. Additionally, other rubbers can be employed such as epichlorohydrin polyethers and ethylene-propylene-diene rubbers and others that are capable of being grafted onto polymers arising from the plastic-forming monomers.

The conjugated diene monomer selected for preparation of the rubber may itself be copolymerized with a comonomer selected from the group consisting of the monovinyl aromatic monomers described hereinabove such as styrene giving styrene-butadiene rubber or SBR, the olefinic nitrile monomers having the structure:

such as acrylonitrile wherein R has the foregoing designation giving butadiene acrylonitrile copolymer or nitrile rubber and, an ester having the structure:

wherein $R_1$ is hydrogen, an alkyl group having from one to 30 carbon atoms, or a halogen, and $R_2$ is an alkyl group having from one to six carbon atoms. Compounds of this type include methyl acrylate, ethyl acrylate, the propyl acrylates, the butyl acrylates, the amyl acrylates, the hexyl acrylates, methyl methacrylate, ethyl methacrylate, the propyl methacrylates, the butyl methacrylates, the amyl methacrylates and the hexyl methacrylates, methyl alphachloroacrylates, ethyl alpha-chloroacrylates and the like with methyl acrylate, ethyl acrylate, methyl methacrylate and ethyl methacrylate being preferred. The rubber polymer contains from 40 to 100 percent by weight of polymerized conjugated diene monomer and from zero to 60 percent by weight of a comonomer.

Equivalent types of monomer and rubber can be substituted for the preferred ones disclosed herein by employing any of those set forth in U.S. Pat. Nos. 2,914,505 and 4,262,096, the subject matter of which is hereby incorporated by reference.

Regarding the composition of the feed solutions, generally speaking the consumption of acrylonitrile, maleic anhydride, and styrene is interrelated to the extent that an increase in one of the components may well result in a disproportionate change of the same component in the product composition, the process typically giving conversion of monomer to polymer of less than 100 percent. Nevertheless, after preparing many thermoplastic resins according to the process of the present invention certain trends were recognized and relationships between such matters as the amount of monomer fed in versus the level found in the product and the effect of one monomer feed versus another were prepared and evaluated.

For example, the slope of the acrylonitrile component had a numerical value of about 1.75, meaning that the amount of acrylonitrile in the feed must be increased by almost two to obtain a unit increase in the level of acrylonitrile in the product. The slope of the maleic anhydride line, however, was less than one. As to the relationship between acrylonitrile in the feed versus acrylonitrile in the product, for different levels of maleic anhydride, the effect of increasing the maleic anhydride in the feed, at a constant acrylonitrile content, decreased the amount of acrylonitrile that was contained in the product. Lastly, increasing the ratio of maleic anhydride to styrene lowered the amount of acrylonitrile incorporated into the product. For instance, at a maleic/styrene ratio of 0.2, about 75 percent of the available acrylonitrile was incorporated into the polymer product while for a maleic/styrene ratio of 0.4, only about 55 percent of the acrylonitrile in the feed became incorporated into the product. By extrapolation to a maleic/styrene ratio of 1.0, little or no acrylonitrile would be found in the product under conditions typical of the process.

In a broad sense, the amount by weight of each component in the initial feed solution by weight can be as follows: from about 60 to 100 parts of the monovinyl aromatic monomer, from about 0 to 40 parts of the aforementioned nitrile monomer and from about 0 to 25 parts of the rubber per hundred parts of monomer(s). If the nitrile monomer is omitted at this stage, it will be added separately as set forth hereinbelow. It can also be added in both stages or feeds.

A second, separate feed stream is also fed to the reactor extruder which comprises a monomer feed with or without rubber. The composition of this feed stream is olefinically unsaturated nitrile monomers and unsaturated, dicarboxylic acid anhydrides the weight ratio of which is 1 to 3:1, respectively, also equivalent to a weight ratio of 50/50 to 75/25, respectively. To 100 parts of the monomer(s) of this feed stream can be added from 0 to about 25 parts of rubber.

Particular terpolymers that have been reduced to practice in the one step, continuous polymerization process of the present invention are composed of styrene, acrylonitrile or AN and maleic anhydride or MAH monomers along with a pre-polymerized rubbery component. Of course, other monomers as well as rubbers can be substituted and it should be understood that the final composition of the rubber-modified thermoplastic resins of this invention can be varied easily by selection of the feed solution composition and the separate liquid monomer feed stream composition. With the aid of a computer it is relatively easy to program various feed compositions and determine the resulting resin compositions.

Styrene usually constitutes the majority ingredient in the polymer product composition and represents concentrations ranging from a minimum of 43 to a maximum of about 75 parts by weight or percent by weight (wt %). Acrylonitrile and maleic anhydride are added to the polymeric backbone at various levels and are responsible for enhanced performance of the resulting material. At any particular styrene concentration within the above range, acrylonitrile and maleic anhydride can be independently varied between very wide ranges.

One particular group of polymer resin compositions capable of being produced via the process set forth herein have acrylonitrile concentrations extending from 20 wt % to 40 wt %. At the higher end of the acrylonitrile range, the polymer product becomes increasingly transparent as evidenced by FIG. 2. Another group of polymers can be produced in the process that have maleic anhydride levels ranging from 30 wt % to 45 wt %. These polymers exhibit enhanced heat distortion temperatures and can contain higher maleic anhydride concentrations than materials previously shown in the art. Plastics can be produced within the process that have relatively high levels of both acrylonitrile and maleic anhydride, which offer a continuous spectrum of physical property selection.

It should be noted that polymers having relatively high levels of both acrylonitrile and maleic anhydride do so at the expense of reducing the concentration of styrene. The practical minimum level of styrene is reached at about 43 wt %. It is therefore implicit that a maximum in the range of any one of the three components requires that the other two components be present at the low end of their respective ranges. A more detailed description of compositions that result follows.

Novel Polymer Compositions with Acrylonitrile Concentrations from 20 to 40 wt %

Polymer products produced in this range of composition have from 43 to 75 wt % styrene, 20 to 40 wt % AN and five to 35 wt % MAH together with two to 30 parts of pre-polymerized impact modifying rubbery phase per 100 parts terpolymer. Not every AN level is entitled to the full compositional range of the other two components as stated hereinabove. For any given terpolymer resin having between 20 and 40 wt % AN, the range limits for the other two components can be defined as follows:

| | |
|---|---|
| MAH | High range limit = 100 − [43 + AN level] |
| | Low range limit = Set at 5 wt % |
| Styrene | High range limit = 100 − [5 + AN level] |
| | Low range limit = Set at 43 wt % |

If a polymer containining 30 wt % AN were desired, its specific composition range according to the above specification would be:

| | | | |
|---|---|---|---|
| AN | 30 wt % | Constant | 30 wt % |
| MAH | 5 wt % | to | 27 wt % |
| Styrene | 65 wt % | to | 43 wt % |
| | 100 parts | | 100 parts |

In addition to the foregoing range specifications, it is also required that the composition values selected add to 100 parts without additional normalization.

Novel Polymer Compositions with MAH Concentrations from 30 to 45 wt %

Polymers can also be prepared via the process of the present invention that contain higher MAH levels than disclosed in prior art. For such polymers having between 30 to 45 wt % MAH, the range limits for the other two components are as follows:

| | |
|---|---|
| AN | High range limit = 100 − [43 + MAH wt % level] |
| | Low range limit = Set at 5 wt % |
| Styrene | High range limit = 100 = [5 + MAH level] |
| | Low range limit = Set at 43 wt % |

Thus, styrene ranges between about 43 to 65 wt % and AN ranges between about five to 27 wt %.

If a polymer containing 40 wt % MAH were desired, its specific composition range would be:

| | | | |
|---|---|---|---|
| MAH | 40 wt % | Constant | 40 wt % |
| AN | 5 wt % | to | 17 wt % |
| Styrene | 55 wt % | to | 43 wt % |
| | 100 parts | | 100 parts |

As in the case with high AN containing polymers, the sum of all monomer concentrations must equal 100 and from about two to 30 parts by weight of rubber per 100 parts of terpolymer will be present.

Returning to the process, the addition of two separate feed streams provides several benefits. First, by dissolving the rubber in one of the feed streams, desirable monomers that would not allow rubbers to solvate can be avoided and be added separately. Thus, in some instances, a small amount of a given monomer could cause a separate rubber-rich phase to form and hence it could not be present in the initial feed solution while in other instances, the initial feed solution can tolerate the presence of some of a given monomer but not in amounts sufficient to provide the desired composition. For instance, a high acrylonitrile/ maleic anhydride containing resin can be prepared according to the present invention by use of an initial feed solution wherein butadiene rubber is dissolved in styrene and a small amount of acrylonitrile and no maleic anhydride. In order to increase the content of the latter two, a separate feed stream comprising acrylonitrile and maleic anhydride is fed to the reactor extruder with the initial feed solution.

Lastly, as stated hereinabove, by employing monomers which will become part of the resin composition, expensive solvents and the time and cost consuming step of their recovery is avoided. It is believed that the ability of the process intimately to mix multiple phases of widely different viscosities, typically arising from the feed stock mixtures described, accounts for the improved thermoplasticity of the resultant resins. Characteristics of the process of the present invention such as short contact time, high temperature, high pressure and high shear also contribute to the production of processable thermoplastic resins having high contents of acrylonitrile or maleic anhydride or related monomers.

The amount of the rubber and thermoplastic monomers chosen will be in part controlled by the solubility of the rubber but also according to the ultimate physical properties desired. In order to impart improved properties such as greater impact strength and adequate tensile strength, it is necessary that the rubber-modified thermoplastic resins have at least about six to 10 parts rubber. An upper limit of about 30 parts is a maximum otherwise the product will be more characteristically a rubber rather than a thermoplastic. It is to be understood that 30 parts is only an upper limit insofar as improving physical properties of the plastics are concerned and that the process of the present invention can be employed to incorporate even greater amounts of rubber.

As not all of the monomers become polymerized in the extruder, residual amounts of unreacted compounds are to be removed. Conversions generally run as high as about 80 percent and yield a product comprising from about three to 30 percent by weight rubber. Average molecular weights of the product can range from about 50,000 to 200,000 with about 120,000 being preferred.

The polymerization of the monomers is via a bulk polymerization system for which an initiator may be employed. Suitable initiators include the azo and organic peroxide types, which are well known to those skilled in the art. These may readily be dissolved in an organic compound, optionally one of the monomers, and predominantly fed to the reactor extruder with the feed solution and separate feed stream.

In producing the resins from these components, other items can be added such as chain transfer agents, dyes and stabilizers. The use and amount of such items, along with the amount of initiators and crosslinking agents are all known in the art and not the subject of the present invention.

For purposes of exemplification, the process set forth herein is particularly suitable for the preparation of high acrylonitrile or maleic anhydride content thermoplastic resins. Such resins contain at least 20 weight percent acrylonitrile and between five and 35 weight percent maleic anhydride or from about 30 to 45 weight percent maleic anhydride and between five and 27 weight percent acrylonitrile, respectively. Polybutadiene rubber having a cis content of at least 98 percent is preferred although a range of about 8 to 100 percent is entirely operable. Average molecular weight of the rubber polymer is from about 100,000 to about 500,000 with 300,000 being preferred.

Regarding the reactor itself, a twin screw reactor extruder is very suitable. Such extruders are known and provide mating twin screws which rotate in the same or opposing directions. Different bushings are placed on the screw shafts, which provide helical screw sections for conveying, and kneading blocks for shearing, wherein controlled polymerization is allowed to occur. The specific configuration and arrangement of conveying and kneading sections selected will depend upon a plurality of factors which relate to the product being sought. Thus, screw rotation and the pitch of the conveying sections will provide control over back-pressure, throughput time and to some extent temperature. The kneading sections similarly are designed to effect control over polymerization time and temperature.

Twin screw extruders of the type useful for the practice of the present invention are set forth in U.S. Pat. Nos. 3,536,680 and 3,799,234. For practice of the present invention, all of the feeds to the extruder are advantageously liquid. Pressure in the feed section is developed by pumps which deliver the feed solution thereto. As the solution passes through the extruder and polymerization occurs, the material becomes solid. Viscous drag forces from the rotating screw create additional pressure. As is known, heat is normally added as needed by incorporating heating elements around the extruder. Similarly, heat can be controlled by suitable heating or cooling means positioned along the extruder to provide the temperatures necessary for polymerization optimization of physical properties. As heat is generated in the reaction zones, where shearing and polymerization occur, it is usually necessary to provide suitable cooling means.

Apart from the fact that the process set forth herein employs a reactor extruder as the polymerization vessel, novelty of the resins claimed is not premised solely on the use of such extruders per se. The preferred process for preparation of these resins calls for the use of a liquid feed solution comprising a rubber polymer dissolved in one or more thermoplastic monomers; a separate feed stream containing one or more additional monomers; and, the various polymerization conditions disclosed herein which provide for the intimate mixing of the multiple immiscible phases that occur within the reactor as the feed solutions are combined and various polymers begin to form. Thus, while the twin screw reactor extruder that has been employed for preparation of these resins is available from Werner and Pfleiderer, other comparable equipment could readily be substituted.

Figure 1:
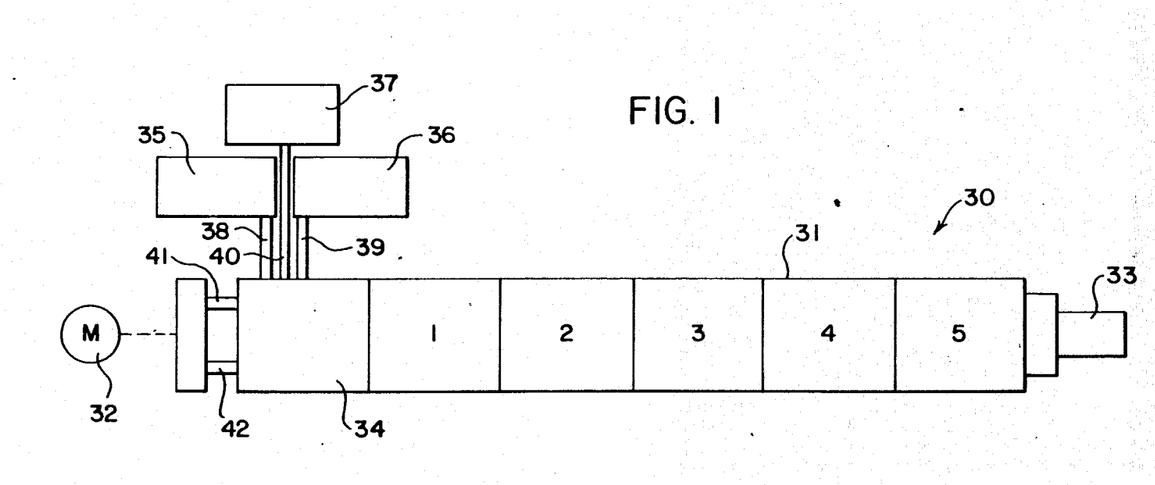
FIG. 1 presents a schematic view of a twin screw reactor extruder apparatus suitable for the preparation of rubber-modified thermoplastic resin compositions according to the present invention.

To aid discussion of the polymerization conducted in the reactor extruder, reference can be made to the drawing which provides a schematic representation of the extruder, indicated generally by the numeral 30. The extruder 30 includes the outer barrel 31, which can be heated and cooled via means not shown, a drive motor 32 and a pelletizer head or other suitable extrusion die 33 preferably providing independently controlled product throughput. A feeding zone 34 is provided for the rubber containing feed solution, separate liquid monomer feed and initiator from independent tanks 35, 36 and 37, respectively, connected by supply lines 38, 39 and 40. Within the extruder 30 are twin screws driven by shafts 41 and 42. The screws, not shown, provide a combination of conveying and kneading action, as discussed hereinabove. Polymerization zones 1 to 5 are depicted which can be heated or cooled independently to control temperature, as indicated for the examples. Vents, not shown, can be provided as necessary to remove volatile gases or residual unreacted monomers flashed off at the die head by the hot polymer.

Polymerization zones 1 to 5 contain different arrangements of conveying sections and kneading or shearing sections as stated hereinabove. Conveying sections are usually provided in zones 1 to 5 while kneading sections will be provided in zones 2 to 4. Individual zones 2 to 4 can also contain some short conveying sections to maintain a flow of polymer as it is formed. The design or arrangement of the extruder screws does not form a part of the subject invention, inasmuch as such technology is within the skill of the art and is determined or controlled by factors such as the polymer being formed and the temperature, pressure, residence time and shear rate desired.

In order for polymerization to begin, an initiation temperature ranging from about 25° to 175° C. should be reached in the feeding zone 34. Temperatures for the reaction in zones 1 to 5 should range between about 149° to 210° C.; at the die head 33, a higher temperature range of about 172° to 210° C. is preferred. Pressures range from about one to 20 atmospheres (0.1 to 2 MPa) in the feed section and from about 20 to 50 atmospheres (2.0 to 5 MPa) during polymerization.

As will be appreciated by those skilled in the art, the use of a known initiator can result in lower initiation temperatures and/or the earlier commencement of polymerization. Also, specific initiators can be selected that will preferentially migrate to either of the immiscible phases being precipitated within the feed port of the reaction extruder.

In the work which is reported hereinbelow, 24 resins produced according to the process of the present invention in a reactor extruder have been reported and characterized. Properties measured and reported for the resins include compositions, molecular weight, rubber content, impact strength, tensile measurements and heat distortion temperature (HDT). In each instance of preparation, the feed solution, comprising the rubber polymer polybutadiene dissolved in the plastic forming monomers was fed to the feed zone of the reactor extruder.

Preparation of Rubber-Modified Thermoplastic Resins

The 24 resins reported hereinbelow are high acrylonitrile or maleic anhydride-content terpolymer resins which were prepared using styrene (S), acrylonitrile (AN), maleic anhydride (MAH) and polybutadiene rubber (BR). Polybutadiene utilized was Taktene 502, the properties of which are set forth in Table I hereinbelow. All parts are presented on a weight percent basis. The polymerizations were initiated in part with peroxides, e.g., 10 weight percent dicumyl peroxide or 4.5 weight percent DHP, 2,5-dimethylhexane 2,5-di-perbenzoate in toluene, and thermally aided.

The resins discussed hereinbelow were analyzed and are reported in Tables II and III which follow. Table II provides feed stream and respective product composition data and Table III provides molecular weights of the resins and various resin properties. Data in Table II is presented parts per hundred monomer (pphm) by weight for the monomers or weight percent of total monomer content and weight percent for rubber based upon the total weight of the monomers.

TABLE I

| Characterizing Properties of Polybutadiene Rubber | |
|---|---|
| Rubber Identification | Taktene 502 Lot 13 |
| Bulk Polymer Properties | |
| Mooney Viscosity (ML$_{1+4}$ at 100° C.) | 28.0 |
| Ash (Wt %) | 0.08 |
| Volatiles (Wt %) | 0.20 |
| Stabilizer[a] (Wt % by addition) | 0.6 |
| Solution Properties (as a 5 w/w % solution in styrene monomer) | |
| Fluid Viscosity | 35.5 |
| APHA Color | 7.5 |

[a]Stabilizer System comprises
Irganox 1076 - 0.15 wt %
Polygard HR - 0.45 wt %

TABLE II

Feed and Product Compositions of Rubber-Modified Thermoplastic Resins

| | Feed Composition | | | | Product Composition | | | |
|---|---|---|---|---|---|---|---|---|
| Resin No. | (pphm S) | (pphm AN) | (pphm MAH) | (Wt % Rubber) | (pphm S) | (pphm AN) | (pphm MAH) | (Wt % Rubber) |
| 1 | 50.5 | 19.8 | 29.7 | 9.5 | 50.9 | 6.6 | 42.5 | 13.0 |
| 2 | 56.2 | 19.1 | 24.7 | 10.3 | 50.1 | 9.0 | 40.9 | 24.4 |
| 3 | 56.3 | 18.2 | 22.5 | 11.1 | 56.1 | 9.8 | 33.7 | 14.7 |
| 4 | 48.0 | 33.0 | 19.0 | 9.6 | 56.1 | 17.5 | 26.4 | a |
| 5 | 51.5 | 30.7 | 17.8 | 10.2 | 60.8 | 18.1 | 21.1 | 16.9 |
| 6 | 55.9 | 29.4 | 14.7 | 7.1 | 47.7 | 18.4 | 33.9 | 27.3 |
| 7 | 47.8 | 32.1 | 20.1 | 9.5 | 60.9 | 18.5 | 20.6 | 17.8 |
| 8 | 50.0 | 32.0 | 18.0 | 9.9 | 61.4 | 19.8 | 18.9 | a |
| 9 | 49.6 | 39.2 | 11.3 | 10.4 | 57.1 | 20.3 | 22.6 | 15.9 |
| 10 | 48.0 | 40.0 | 12.0 | 10.1 | 57.8 | 20.6 | 21.6 | 17.8 |
| 11 | 31.6 | 45.6 | 22.8 | 6.1 | 45.1 | 20.7 | 34.2 | 17.4 |
| 12 | 51.4 | 38.1 | 10.5 | 10.8 | 59.8 | 20.9 | 19.2 | 17.3 |
| 13 | 60.7 | 32.1 | 7.2 | 14.3 | 66.4 | 21.6 | 12.0 | 14.6 |
| 14 | 53.4 | 37.0 | 9.6 | 11.2 | 60.5 | 22.2 | 17.3 | 19.7 |
| 15 | 55.9 | 29.4 | 14.7 | 7.1 | 59.2 | 22.6 | 18.2 | 14.0 |
| 16 | 30.8 | 47.1 | 22.2 | 8.1 | 44.2 | 27.4 | 28.4 | 0.6 |
| 17 | 48.9 | 41.4 | 9.7 | 9.7 | 60.5 | 27.5 | 12.0 | 17.3 |
| 18 | 44.2 | 39.2 | 16.6 | 10.4 | 49.1 | 27.9 | 23.0 | 11.2 |
| 19 | 43.7 | 45.0 | 11.3 | 8.8 | 59.1 | 28.1 | 12.9 | 13.1 |
| 20 | 61.8 | 32.5 | 5.7 | 12.0 | 63.4 | 28.2 | 8.4 | 17.3 |
| 21 | 49.9 | 40.7 | 9.4 | 9.9 | 61.2 | 28.2 | 10.6 | 17.6 |
| 22 | 46.9 | 42.8 | 10.3 | 9.4 | 56.4 | 32.3 | 11.3 | 15.2 |
| 23 | 31.5 | 49.1 | 19.4 | 6.9 | 50.8 | 37.9 | 11.3 | 18.6 |
| 24 | 36.8 | 46.3 | 17.0 | 8.0 | 52.6 | 38.1 | 9.2 | 21.1 |

[a]Not determined

TABLE II-continued

Feed and Product Compositions of Rubber-Modified Thermoplastic Resins

| Resin No. | Feed Composition | | | | Product Composition | | | |
|---|---|---|---|---|---|---|---|---|
| | (pphm S) | (pphm AN) | (pphm MAH) | (Wt % Rubber) | (pphm S) | (pphm AN) | (pphm MAH) | (Wt % Rubber) |
| 19 | 43.7 | 45.0 | 11.3 | 8.8 | 59.1 | 28.1 | 12.9 | 13.1 |
| 20 | 61.8 | 32.5 | 5.7 | 12.0 | 63.4 | 28.2 | 8.4 | 17.3 |
| 21 | 49.9 | 40.7 | 9.4 | 9.9 | 61.2 | 28.2 | 10.6 | 17.6 |
| 22 | 46.9 | 42.8 | 10.3 | 9.4 | 56.4 | 32.3 | 11.3 | 15.2 |
| 23 | 31.5 | 49.1 | 19.4 | 6.9 | 50.8 | 37.9 | 11.3 | 18.6 |
| 24 | 36.8 | 46.3 | 17.0 | 8.0 | 52.6 | 38.1 | 9.2 | 21.1 |

$^a$Not determined

TABLE III

| Resin No. | HDT °C. | Resin Properties | | | |
|---|---|---|---|---|---|
| | | Notched Izod kJ/m | Tensile Strength MPa | Tensile Modulus GPa | Mol. Wt. (Mw) |
| 1 | 84 | 0.011 | 23.46 | $a$ | $a$ |
| 2 | 113 | 0.032 | 26.22 | $a$ | $a$ |
| 3 | 122 | 0.059 | 36.57 | $a$ | $a$ |
| 4 | 122 | 0.101 | 39.68 | 2.31 | $a$ |
| 5 | 112 | 0.192 | 38.30 | 2.48 | 143,700 |
| 6 | 123 | 0.092 | 57.96 | 3.17 | 176,900 |
| 7 | 119 | 0.181 | 34.50 | 2.35 | 139,500 |
| 8 | 109 | 0.146 | 31.05 | 2.35 | 117,000 |
| 9 | 118 | 0.111 | 50.37 | 2.45 | 115,600 |
| 10 | 123 | 0.091 | 38.64 | 2.32 | 119,700 |
| 11 | $a$ | $a$ | $a$ | $a$ | $a$ |
| 12 | 109 | 0.170 | 43.47 | 2.52 | 131,200 |
| 13 | 91 | 1.39 | 19.32 | 11.73 | $a$ |
| 14 | 101 | 0.239 | 42.09 | 1.93 | 116,700 |
| 15 | 110 | 0.089 | 54.17 | 2.73 | 123,500 |
| 16 | 105 | 0.11 | 17.94 | 24.84 | $a$ |
| 17 | 101 | 0.145 | 46.92 | 2.48 | 81,600 |
| 18 | 104 | 0.11 | $a$ | 22.77 | $a$ |
| 19 | 100 | 0.090 | 37.95 | 2.00 | 85,000 |
| 20 | 101 | 0.105 | 30.36 | 1.93 | 75,200 |
| 21 | 103 | 0.116 | 34.50 | 2.21 | 78,800 |
| 22 | 104 | 0.085 | 43.47 | 2.14 | 83,000 |
| 23 | 93 | 0.11 | 27.6 | 15.18 | 70,400 |
| 24 | 93 | 0.11 | 26.91 | 20.01 | 70,100 |

$^a$Not determined

As can be noted from Table II, 16 of the resins had an acrylonitrile content greater than about 20 weight percent while eight were less. Maleic anhydride content ranged between about 8.4 and 42.5 weight percent. Resin No. 1 had the lowest acrylonitrile and highest maleic anhydride content. Resins No. 9-24 were all outside of the range of compositions disclosed in U.S. Pat. Nos. 4,223,096 and 4,263,096, referred to hereinabove which were limited to less than 20 weight percent acrylonitrile content. Resin No. 4 also contained a level of maleic anhydride close to the maximum set forth in these patents. The resins specifically claimed herein have unsaturated nitrile contents of at least 20 weight percent (Resins No. 9-24) or unsaturated dicarboxylic acid anhydride contents between about 30 to 45 weight percent.

With reference to Table III, it can be seen that with the exception of Resins No. 1, 13, 23 and 24, heat distortion temperatures were at or greater than 100° C. Several of the resins, particularly Nos. 5, 7, 8, 12, 13, 14, 17 and 21 had outstanding Notched Izod values and, tensile properties were all quite acceptable. It is to be understood that the resins were not particularly optimized for impact strength as evidenced by the low Notched Izod values for Resins No. 1-3, 16, 18, 23 and 24. The latter have been provided merely to demonstrate that the process of the present invention can produce rubber-modified thermoplastic resins having a maleic anhydride content of up to about 45 percent by weight or an acrylonitrile content of up to about 40 percent by weight. Generally, we have also demonstrated higher maleic anhydride contents for given levels of acrylonitrile than are known in the art.

Figure 2:
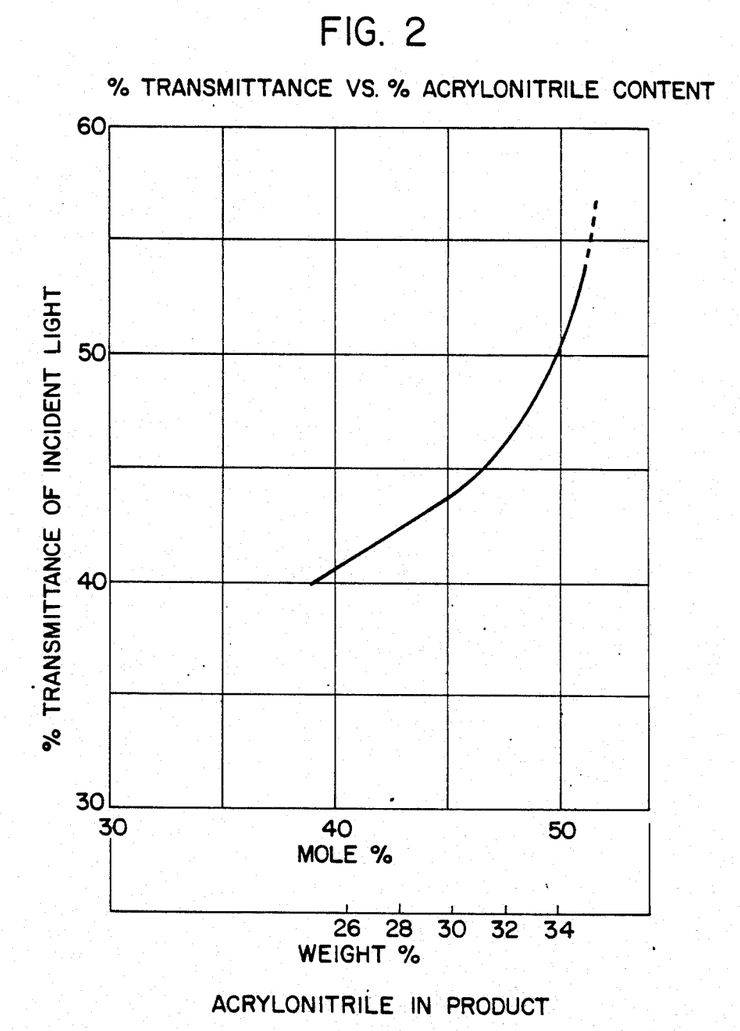
FIG. 2 graphically depicts the relationship between translucency and acrylonitrile content for rubber-modified resin prepared according to the process of the present invention.

Another property of rubber-modified thermoplastics of the type disclosed herein is their translucency. FIG. 2 graphically demonstrates the increase in light transmittance obtained as the molar or weight percent of acrylonitrile is increased. The resins examined coincide with Nos. 17, 19, 20, 21 and 22 and other resins not reported in Table II which used a constant loading of dicumyl peroxide initiator. It can be noted that the slope of the translucency curve is relatively flat at 36 mole percent acrylonitrile (approximately 26 weight percent) but increases very rapidly as the polymer approaches 50 mole percent acrylonitrile (approximately 35 weight percent).

We believe that the resins claimed herein clearly differ in intramolecular composition from the polymers produced by the processes of the art discussed hereinabove which have similar overall compositions and are, therefore, deemed to be novel. It is well known to those skilled in the art, for instance, that block, graft and random polymers having the same overall composition have very different physical properties. The block, graft and random copolymers of styrene and butadiene are but one typical example of this effect. It is, therefore, believed that the unique reaction conditions achievable by the current process herein defined give rise to an advantageous molecular configuration which overcomes the limitations of the revealed art and provides polymers having good utility throughout the composition ranges disclosed in overall terms in U.S. Pat. No. 3,919,354.

It is to be noted that earlier patents have taught a complicated, semi-batch, continuous addition technique that is only able to synthesize a narrow band of useful resins contained within the wide range of operability disclosed herein. U.S. Pat. Nos. 4,223,096 and 4,262,096 specifically state that resin compositions lying outside this range are intractable and lack utility because they cannot be molded or fabricated into functional parts. The novelty of the present process is indeed demonstrated by its ability to make moldable, useful parts possessing distinct physical property advantages in ranges clearly outside of the limits of prior teachings thereby providing novel resins.

In conclusion, it is to be understood that practice of the process of the present invention should not be limited to a particular reactor extruder so long as essentially similar conditions are provided while the polymer resin is forming. Likewise, so long as a feed solution is employed comprising a rubber polymer in one or more ethylenically unsaturated monomers and, an independent liquid monomer feed is fed to the reactor extruder, selection of the various monomers and rubber polymers can be made based upon the type of thermoplastic resin sought. Moreover, it is believed that the use of particular components as well as the amounts thereof can be made depending upon the resin properties desired. Similarly, control over process parameters such as temperature, pressure, throughput rate, residence time, and the like can be varied as desired depending upon the reactor employed and the resin to be prepared.

Thus, it can be seen that the disclosed invention carries out the objects set forth hereinabove. It is believed that the variables disclosed herein can readily be determined and controlled without departing from the spirit of the invention herein disclosed and described. Moreover, the scope of the invention shall include all modifications and variations that fall within the scope of the attached claims.

We claim:

1. A process for the preparation of novel rubber modified thermoplastic resin compositions in a reactor, capable of intimately mixing multiple immiscible phases, comprising the steps of:
    dissolving a rubber polymer in a monomer selected from the group consisting of monovinyl aromatic monomers, olefinically unsaturated nitriles and mixtures thereof to form a feed solution;
    introducing said feed solution into a rector;
    introducing into said reactor a separate liquid monomer feed stream said monomers being selected from the group consisting of unsaturated dicarboxylic acid anhydrides, olefinically unsaturated nitriles and mixtures thereof;
    heating said feed solution and feed stream under pressure to a temperature sufficient for polymerization to begin; and
    intimately mixing and polymerizing said monomers around said rubber polymer in said reactor to form a thermoplastic resin composition having a composition comprising:
        from about 43 to about 75 parts by weight derived from a monovinyl aromatic monomer;
        from about 20 to about 40 parts by weight derived from an olefinically unsaturated nitrile monomer; and
        from about five to about 35 parts by weight derived from an unsaturated dicarboxylic acid anhydride monomer, providing 100 parts of a thermoplastic terpolymer; and
        from about two to 30 parts of a rubber polymer per 100 parts of said thermoplastic terpolymer.

2. The process of claim 1, wherein said monovinyl aromatic monomers have from eight to about 20 carbon atoms;
    said olefinically unsaturated nitriles have the structure wherein R is hydrogen, a lower alkyl group having from one to four carbon atoms or a halogen; and
    said unsaturated dicarboxylic acid anhydrides are selected from the group consisting of dicarboxylic acids having an internal anhydride group.

3. The process of claim 2, wherein said rubber polymer is selected from the group consisting of conjugated diene homopolymers having from four to about 12 carbon atoms, copolymers thereof with said monovinyl aromatic monomers, said olefinically unsaturated nitrile monomers, and esters of olefinically unsaturated carboxylic acids having the structure wherein $R_1$ to hydrogen, an alkyl group having from 1 to 30 carbon atoms, or a halogen, and $R_2$ is an alkyl group having from one to six carbon atoms;
    epichlorohydrin polyethers; and
    ethylene-propylene-diene rubber.

4. The process of claim 1, wherein said reactor is a reactor extruder having twin, co-rotating screws and a feed section.

5. The process of claim 4, wherein said step of heating said feed solution and feed stream is conducted at a temperature of from about 25° C. to 175° C. and under a pressure of from about 0.1 to 2 MPa.

6. The process of claim 5, wherein said polymerizing step is conducted at a temperature of from 149° C. to 210° C. and under a pressure of from about 2.0 to 5 MPa.

7. The process of claim 6, wherein the time for said polymerizing step ranges from about two to about 20 minutes.

8. A process for the preparation of novel rubber modified thermoplastic resin compositions in a reactor, capable of intimately mixing multiple immiscible phases, comprising the steps of:
    dissolving a rubber polymer in a monomer selected from the group consisting of monovinyl aromatic monomers, olefinically unsaturated nitriles and mixtures thereof to form a feed solution;
    introducing said feed solution into a rector;
    introducing into said reactor a separate liquid monomer feed stream said monomers being selected from the group consisting of unsaturated dicarboxylic acid anhydrides, olefinically unsaturated nitriles and mixtures thereof;

heating said feed solution and feed stream under pressure to a temperature sufficient for polymerization to begin; and intimately mixing and polymerizing said monomers around said rubber polymer in said reactor to form a thermoplastic resin composition having a composition comprising:

from about 43 to about 65 parts by weight derived from a monovinyl aromatic monomer;

from about five to about 27 parts by weight derived from an olefinically unsaturated nitrile monomer; and from about 30 to about 45 parts by weight derived from an unsaturated dicarboxylic acid anhydride monomer, providing 100 parts of a thermoplastic terpolymer; and from about two to 30 parts of a rubber polymer per 100 parts of said thermoplastic terpolymer.

9. The process of claim 8, wherein said monovinyl aromatic monomers have from eight to about 20 carbon atoms;

said olefinically unsaturated nitriles have the structure wherein R is hydrogen, a lower alkyl group having from one to four carbon atoms or a halogen; and said unsaturated dicarboxylic acid anhydrides are selected from the group consisting of dicarboxylic acids having an internal anhydride group.

10. The process of claim 9, wherein said rubber polymer is selected from the group consisting of conjugated diene homopolymers having from four to about 12 carbon atoms, copolymers thereof with said monovinyl aromatic monomers, said olefinically unsaturated nitrile monomers, and esters of olefinically unsaturated carboxylic acids having the structure wherein $R_1$ to hydrogen, an alkyl group having from 1 to 30 carbon atoms, or a halogen, and $R_2$ is an alkyl group having from one to six carbon atoms;

epichlorohydrin polyethers; and ethylene-propylene-diene rubber.

11. The process of claim 8, wherein said reactor is a reactor extruder having twin, co-rotating screws and a feed section.

12. The process of claim 11, wherein said step of heating said feed solution and feed stream is conducted at a temperature of from about 25° C. to 175° C. and under a pressure of from about 0.1 to 2 MPa.

13. The process of claim 12, wherein said polymerizing step is conducted at a temperature of from 149° C. to 210° C. and under a pressure of from about 2.0 to 5 MPa.

14. The process of claim 13, wherein the time for said polymerizing step ranges from about two to about 20 minutes.

15. A moldable rubber-modified thermoplastic resin comprising:

from about 43 to about 75 parts by weight derived from a monovinyl aromatic monomer;

in excess of 20 to about 40 parts by weight derived from an olefinically unsaturated nitrile monomer; and from about five to about 35 parts by weight derived from an unsaturated dicarboxylic acid anhydride monomer, providing 100 parts of a termoplastic terpolymer; and from about two to 30 parts of a rubber polymer per 100 parts of said thermoplastic terpolymer; said thermoplastic resin having improved physical properties including thermoplastic processability at temperatures up to about 250° C.

16. A rubber-modified thermoplastic resin, as set forth in claim 15, wherein said monovinyl aromatic monomers have from eight to about 20 carbon atoms;

said olefinically unsaturated nitriles have the structure wherein R is hydrogen, a lower alkyl group having from one to four carbon atoms or a halogen;

said unsaturated dicarboxylic acid anhydrides are selected from the group consisting of dicarboxylic acids having an internal anhydride group; and said rubber polymer is selected from the group consisting of conjugated diene homopolymers having from four to about 12 carbon atoms, copolymers thereof with said monovinyl aromatic monomers, said olefinically unsaturated nitrile monomers, and esters of olefinically unsaturated carboxylic acids having the structure wherein $R_1$ is hydrogen, an alkyl group having from 1 to 30 carbon atoms, or a halogen, and $R_2$ is an alkyl group having from one to six carbon atoms;

epichlorohydrin polyethers; and ethylene-propylene-diene rubber.

17. A rubber-modified thermoplastic resin as set forth in claim 16, wherein said rubber polymer is butadiene rubber;

said monovinyl aromatic monomer is styrene;

said olefinically unsaturated nitrile monomer is acrylonitrile; and said unsaturated dicarboxylic acid anhydride is maleic anhydride.

18. A rubber-modified thermoplastic resin, as set forth in claim 15, containing between about 35 and 40 weight percent of said olefinically unsaturated nitrile component and up to about 22 weight percent of said unsaturated dicarboxylic acid anhydride component with a monovinyl aromatic component of at least 43 weight percent.

* * * * *